United States Patent [19]

Katagiri

[11] Patent Number: 5,377,066
[45] Date of Patent: Dec. 27, 1994

[54] MAGNETIC TAPE CASSETTE HAVING FRICTION SHEET PROTRUDING PORTIONS WITH WAVILY CURVED SIDE EDGES

[75] Inventor: Shingo Katagiri, Kanagawa, Japan
[73] Assignee: Fuji Photo Film Co., Ltd., Kanagawa, Japan
[21] Appl. No.: 206,274
[22] Filed: Mar. 7, 1994

Related U.S. Application Data

[63] Continuation of Ser. No. 651,089, Feb. 6, 1991, abandoned.

[30] Foreign Application Priority Data

Feb. 22, 1990 [JP] Japan .................. 2-16132[U]

[51] Int. Cl.⁵ ............................................ G11B 23/04
[52] U.S. Cl. .................. 360/132; 242/345.2; 242/345.3
[58] Field of Search ......... 360/132; 242/199, 198-200

[56] References Cited

U.S. PATENT DOCUMENTS

| | | | |
|---|---|---|---|
| 3,675,875 | 7/1972 | Schmidt | 242/199 |
| 3,977,626 | 8/1976 | Gaiser et al. | 242/199 |
| 4,101,096 | 7/1978 | Oishi et al. | 242/199 |
| 4,102,515 | 7/1978 | Milants | 242/199 |
| 4,127,242 | 11/1978 | Hashimoto et al. | 242/199 |
| 4,128,216 | 12/1978 | Hioki | 242/199 |
| 4,289,285 | 9/1981 | Ishida et al. | 242/199 |
| 4,328,936 | 5/1982 | Bordignon | 242/199 |
| 4,452,408 | 6/1984 | Sasaki | 360/132 |
| 4,466,036 | 8/1984 | Ishida et al. | 242/199 |
| 4,516,181 | 5/1985 | Shirako | 242/199 |
| 4,541,588 | 9/1985 | Sato | 242/199 |
| 4,563,718 | 1/1986 | Shirako | 360/132 |
| 4,838,496 | 6/1989 | Kubota et al. | 242/76 |

FOREIGN PATENT DOCUMENTS

| | | |
|---|---|---|
| 2211818 | 7/1989 | European Pat. Off. . |
| 2188233 | of 0000 | France . |
| 2246017 | of 0000 | France . |
| 2736760 | 3/1979 | Germany .......... 242/199 |
| 8909704 | 8/1989 | Germany . |

Primary Examiner—A. J. Heinz
Assistant Examiner—Jefferson Evans
Attorney, Agent, or Firm—Sughrue, Mion, Zinn, Macpeak & Seas

[57] ABSTRACT

A magnetic tape cassette including a pair of hubs which are rotatably supported in an internal opening defined between upper and lower half portions of a body of the cassette and on which a magnetic tape is wound, and friction sheets provided between the tops and bottoms of the hubs and the upper and lower inside surfaces of the cassette. Each of the sheets includes projecting portions having substantially rectangular cross sections and extending substantially in a longitudinal direction of the sheet so that the protruding portions reach both ends of the sheet and at least two hub holes are located between the protruding portions. At least one side edge of the top of each of the protruding portions is wavily curved, and the width of each of the protruding portions is relatively small at both ends of the protruding portion. The hubs and the tape are supported by tops of the protruding portions.

19 Claims, 3 Drawing Sheets

MAGNETIC TAPE CASSETTE HAVING FRICTION SHEET PROTRUDING PORTIONS WITH WAVILY CURVED SIDE EDGES

This is a continuation of application Ser. No. 07/651,089 filed Feb. 6, 1991, now abandoned.

BACKGROUND OF THE INVENTION

The present invention relates to a magnetic tape cassette, particularly to a magnetic tape cassette in which friction sheets are provided between the body of the cassette and hubs on which a magnetic tape is wound.

A magnetic tape cassette is widely used as a record/playback medium with an audio apparatus such as a magnetic tape recorder. In the cassette, a pair of flangeless hubs on which a magnetic tape is wound are rotatably supported in a cassette body composed of an upper and a lower half portion. When the magnetic tape cassette is used with a tape recorder, the magnetic tape is typically repeatedly and frequently run and stopped as the recorder is put in a recording or playback mode, a stop mode, a rapid running mode, a stop mode, etc. For that reason, friction sheets are provided on the inside surfaces of the upper and lower body portions of the cassette. The friction sheets have surfaces having properties so as to maintain good running properties of the magnetic tape and to apply an appropriate tensile force to the tape during the running thereof and prevent the tape from undergoing slackening or the like when the tape is stopped.

For this purpose, each of the friction sheets is a thin sheet of a soft synthetic resin. Some such friction sheets are processed for prevention of static electric charging, and are embossed, curved appropriately, or are provided with protruding portions of appropriate height. For a friction sheet of very small thickness, such protruding portions serve to effectively increase the thickness of the sheet and enhance its function of supporting the hubs and the magnetic tape to prevent them from moving in the direction of thickness of the cassette. However, friction sheets having such protruding portions have certain problems, as will now be described.

Friction sheets having protruding portions can be broadly divided into two types, as shown in FIGS. 6 and 7. The friction sheet 30 of the type shown in FIG. 6 has two protruding portions 37 and 38 having nearly rectangular or U-shaped cross sections and straightly extending in parallel with each other in the longitudinal direction of the sheet so that the protruding portions extend to both ends 3a and 3b of the sheet and the hub holes 4 of the sheet are located between the protruding portions The friction sheet 40 of the type shown in FIG. 7 has two protruding portions 47 and 48 having nearly rectangular or U-shaped cross sections and straightly extending in parallel with each other in the longitudinal direction of the sheet so that the protruding portions do not reach the ends 3a and 3b of the sheet and the hub holes 4 of the sheet are located between the protruding portions, namely, the sheet is flat at both ends thereof, as differs from the former type shown in FIG. 6.

Since the protruding portions 37 and 38 of the friction sheet 30 of the type shown in FIG. 6 extend throughout the whole length of the sheet, the sheet has an advantage that the protruding portions are capable of functioning well with a magnetic tape wound to a large diameter. However, the sheet has a disadvantage that since the protruding portions are open at both ends 3a and 3b of the sheet, the protruding portions tend during prolonged use to be elongated in the direction B of the width of the portions at and near the ends 3a and 3b and to be reduced in height from a preset value so that the supporting function of the protruding portions is reduced.

Since the protruding portions 47 and 48 of the friction sheet 40 of the type shown in FIG. 7 are closed at the ends of the portions inside the ends of the sheet, the sheet does not have the disadvantage that the protruding portions are likely to be elongated in the direction B of the width of the portions. However, the sheet has a problem in that wrinkles 50 tend to form at and near the ends of the protruding portions. The smaller the distance between the end of each of the protruding portions 47 and 48 and the end 3a or 3b of the sheet is, the more likely the wrinkles 50 are to occur. Due to the wrinkles 50, the sheet 40 undergoes strain, causing the sheet to be deformed to warp at or near the ends 3a and 3b thereof, thereby decreasing the degree of flatness of the sheet and deteriorating the function of the sheet in such a manner that the deformed parts of the sheet come into contact with the magnetic tape.

SUMMARY OF THE INVENTION

The present device was made in consideration of the problems mentioned above. Accordingly, it is an object of the device to provide a magnetic tape cassette having friction sheets including protruding portions constructed such that the sheets have no wrinkles due to the protruding portions, the tape-supporting areas of the protruding portions are large, and the height of each of the protruding portions is maintained constant.

The magnetic tape cassette provided in accordance with the present device includes a pair of hubs which are rotatably supported in an internal opening defined between upper and lower half portions of the body of the cassette and on which a magnetic tape is wound, and friction sheets provided between the tops and bottoms of the hubs and the upper and lower inside surfaces of the cassette. The magnetic tape cassette is characterized in that each of the friction sheets includes protruding portions having substantially rectangular cross sections and extending substantially in the longitudinal direction of the sheet so that the protruding portions reach both ends of the sheet and at least two hub holes are located between the protruding portions, at least one side edge of the top of each of the protruding portions is wavily curved, the width of each of the protruding portions is relatively small at both the ends of the protruding portions, and the hubs and the tape are supported by the tops of the protruding portions.

DESCRIPTION OF THE PREFERRED EMBODIMENTS

Preferred embodiments of the present device are hereafter described with reference to the drawings attached hereto.

Figure 1:
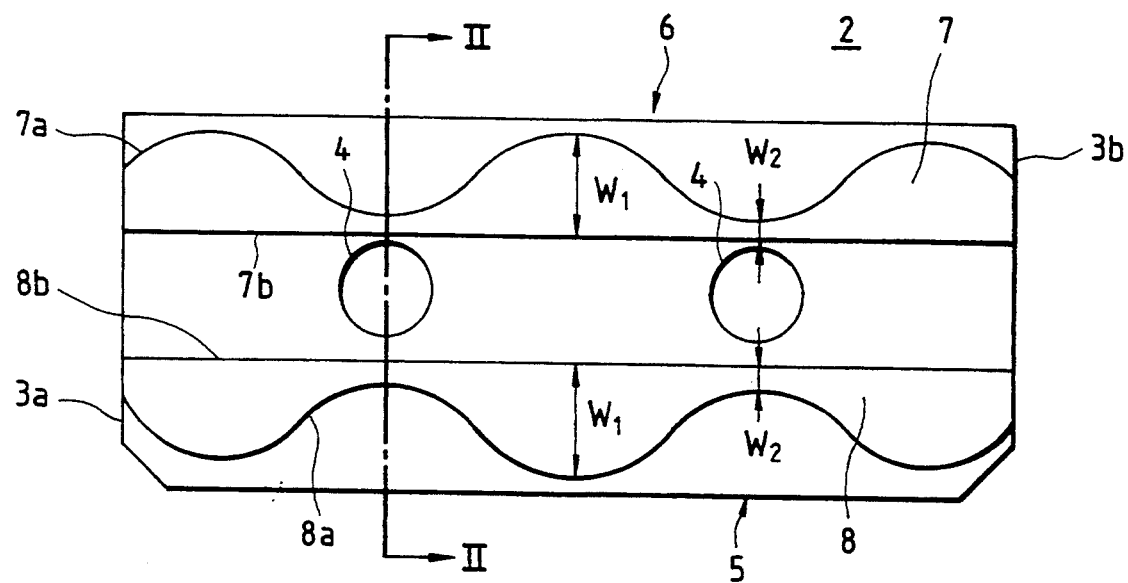
FIG. 1 is a plan view of the friction sheet of a magnetic tape cassette constructed in accordance with a preferred embodiment of the present invention.
Figure 2:
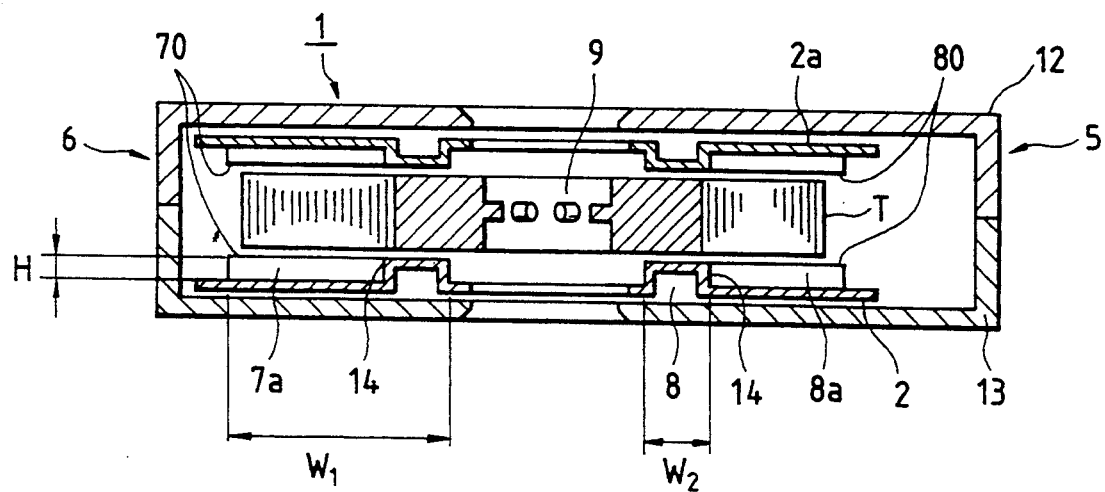
FIG. 2 is a sectional view of the cassette taken along a line II—II in FIG. 1.

FIG. 1 is a plan view of the friction sheet 2 of a magnetic tape cassette 1 constructed in accordance with a preferred embodiment, which cassette is intended for audio use. FIG. 2 is a sectional view of the cassette taken along a line II—II in FIG. 1.

The cassette 1 has an internal opening defined between the upper and lower half portions 12 and 13 of the body of the cassette and in which a pair of hubs 9, on which a magnetic tape T is wound, are rotatably supported, as shown in FIG. 2. One friction sheet 2a of the cassette 1 is provided between the upper inside surface thereof and the tops of the hubs 9. The other friction sheet 2 of the cassette 1 is provided between the lower inside surface thereof and the bottoms of the hubs 9. The friction sheets 2 and 2a have the same constitution.

FIG. 1 shows the friction sheet 2 disposed between the lower inside surface of the cassette 1 and the bottoms of the hubs 9. The friction sheet 2 has two protruding portions 7 and 8 extending in the longitudinal direction of the sheet with the portion 7 located between the rear 6 of the cassette 1 and the hub holes 4 of the sheet, and the other portion 8 located between the front 5 of the cassette and the hub holes. Each of the protruding portions 7 and 8 has a nearly rectangular or U-shaped cross section, and reaches the ends 3a and 3b of the sheet 2.

The protruding portions 7 and 8 are open at the ends 3a and 3b of the sheet 2 so that the form of the cross section of each of the protruding portions appears on the ends of the sheet. The hubs 9 and the magnetic tape T are supported by the tops 70 and 80 of the protruding portions 7 and 8. One side edge 7b of the top 70 and one side edge 8b of the top 80 extend straight, while the other side edges 7a and 8a of the tops are wavily curved, as shown in FIG. 1. The width of each of the protruding portions 7 and 8 is relatively small at the ends 3a and 3b of the friction sheet 2.

The protruding portions 7 and 8 include curved wall surfaces 14 extending up to the curved side edges 7a and 8a of the tops of the portions in the direction of thickness of the friction sheet 2. The height H of each of the curved wall surfaces 14, which is the height of the protruding portion, is set at about 0.1 to 0.3 mm, for example. The width of each of the protruding portions 7 and 8 is gradually increased and decreased so that the portion has a maximum width $W_1$ between the hub holes 4 so as to support the magnetic tape t, and has minimum widths $W_2$ at the hub holes so as to support the hubs 9.

Since the protruding portions 7 and 8 have the curved wall surfaces 14 extending in the direction of the thickness of the friction sheet 2, the rigidity of the protruding portions is increased to make the portions less likely to be elongated in the direction of the width thereof by a force acting on the sheet in the direction of the thickness thereof, and is kept sufficiently high at and near the ends 3a and 3b of the sheet to maintain the height of the portions.

Figure 7:
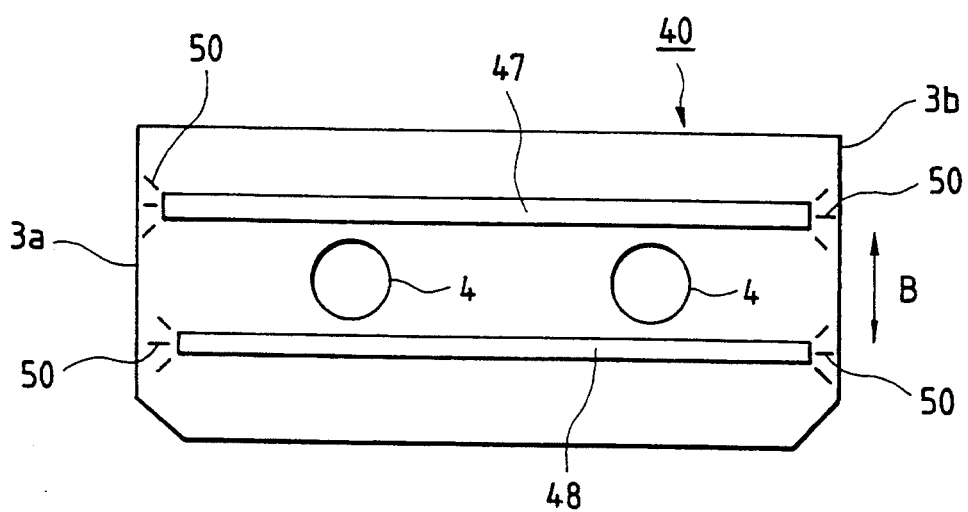

Since the protruding portions 7 and 8 extend to the ends 3a and 3b of the friction sheet 2, the supporting areas of the portions are large and the size of the sheet is fully utilized. Since the width of the protruding portions 7 and 8 is so small at the ends 3a and 3b of the sheet 2 that the portions are nearly closed at those of the friction sheet shown in FIG. 7, the rigidity of the protruding portions is kept high at the ends of the sheet to withstand an external force which might deform the portions. Since the curved side edges 7a and 8a of the protruding portions 7 and 8 are wavily curved in such a manner as to have a phase difference of nearly a half wavelength from each other at the hub holes 4 of the friction sheet 2 and be each nearly symmetric about the hub holes in the longitudinal direction of the sheet, the contact areas of the protruding portions for the hubs 9 and the magnetic tape T are symmetric rightward and leftward therefrom in the longitudinal direction of the sheet. By "substantially a half wavelength" means that the error in the waveform of each of the wavily curved side edges 7a and 8a of the protruding portions 7 and 8 is about ±10/180° of the desired waveform thereof.

Since the magnetic tape cassette 1 includes the friction sheet 2 described above, the hub 9 on which the magnetic tape T is wound to a large diameter is securely supported by the tops 70 and 80 of the protruding portions 7 and 8 of the sheet so that the play of the hub is restricted to be small. Since the height H of each of the protruding portions 7 and 8 is maintained substantially at the initially set value thereof throughout the protruding portion, a desired tensile force is always stably applied to the magnetic tape T. For these reasons, the running of the tape T and the appearance of the wound tape are kept good.

Figure 3:
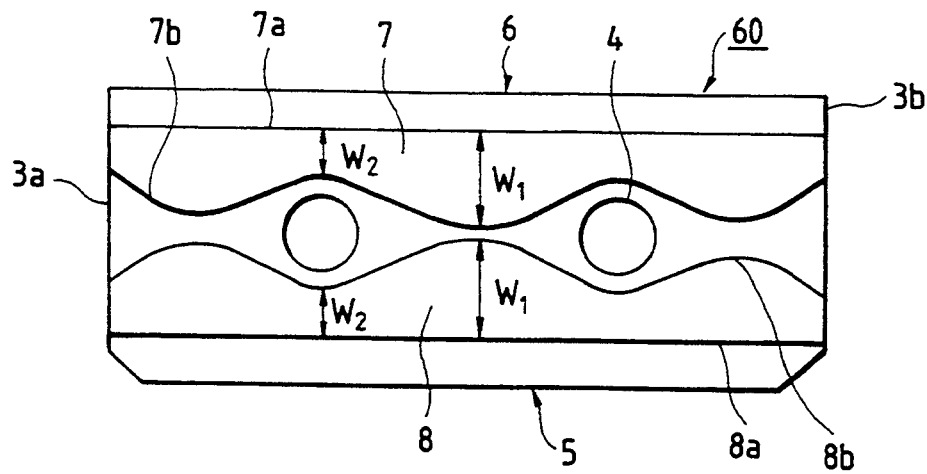
FIGS. 3, 4 and 5 are plan views of friction sheets which are modifications of the friction sheet shown in FIG. 1.
Figure 4:
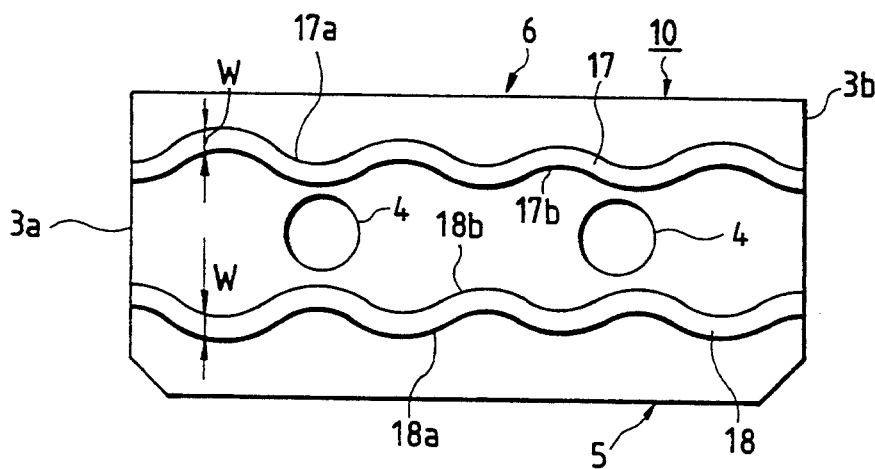
Figure 5:
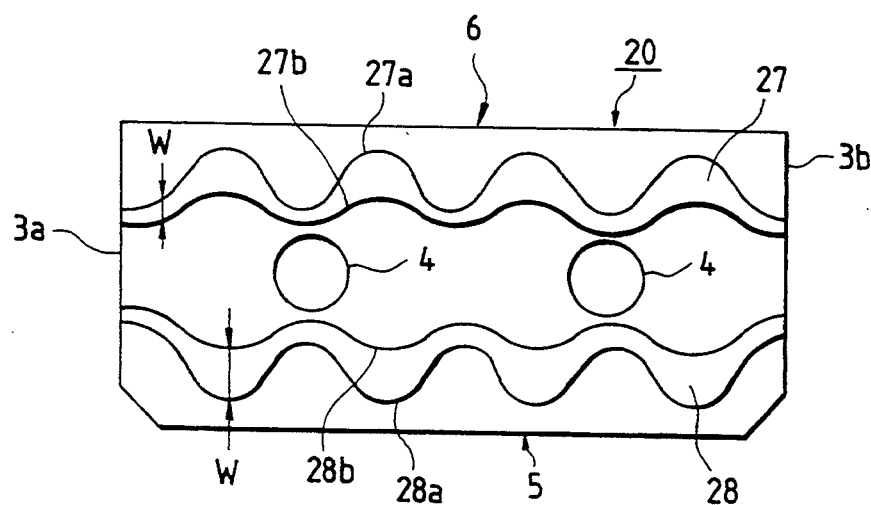
Figure 6:
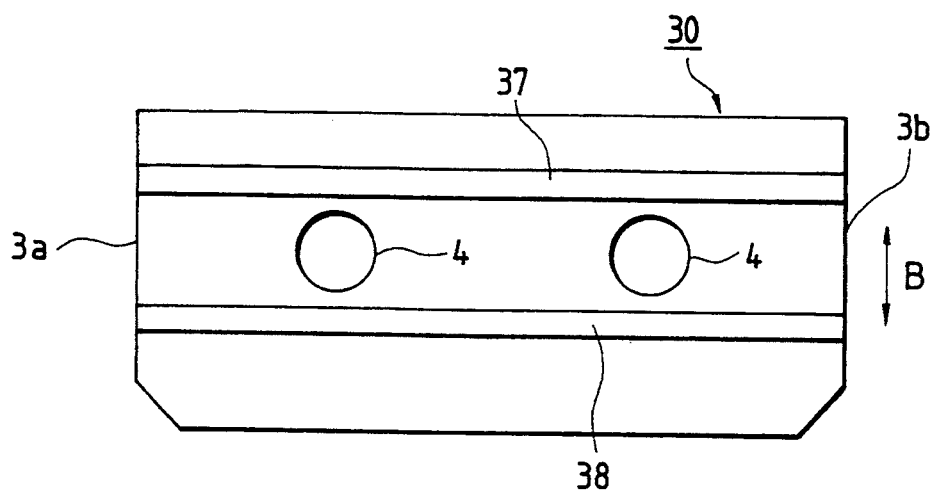
FIGS. 6 and 7 are plan views of conventional friction sheets.

Although only one side edge of each of the tops 70 and 80 of the protruding portions 7 and 8 of the friction sheet is wavily curved in the embodiment described above, the present invention is not limited to this arrangement, and may be embodied in various other ways, as shown in FIGS. 3, 4 and 5.

A friction sheet 60 provided in accordance with the present invention as shown in FIG. 3 has two protruding portions 7 and 8 having outer straight side edges 7a and 8a and inner curved side edges 7b and 8b (which differs from the friction sheet 2 shown in FIG. 1). The friction sheet 60 is the same as the previously described friction sheet in other respects.

A friction sheet 10 provided in accordance with the present invention as shown in FIG. 4 has two protruding portions 17 and 18 having rectangular cross sections and wavily curved side edges 17a, 17b, 18a and 18b extending in parallel with each other so that the width W of each of the protruding portions is maintained substantially constant. The protruding portions 17 and 18 are shaped symmetrically with respect to each other about the hub holes 4 of the friction sheet 10 in the direction of the width thereof.

A friction sheet 20 provided in accordance with the present device and shown in FIG. 5 has two protruding portions 27 and 28 including wavily curved side edges 27a, 27b, 28a and 28b. The wavily curved side edges 27a and 27b differ from each other in the amplitude of the wave thereof, and the other wavily curved side edges 28a and 28b also differ from each other in the amplitude of the wave thereof, so that the width W of each of the protruding portions 27 and 28 changes in a regular manner. The protruding portions 27 and 28 are shaped symmetrically with respect to each other about the hub holes 4 of the friction sheet 20 in the direction of the width thereof, and have rectangular cross sections. Although the wavily curved side edges 27a, 27b, 28a and 28b differ from each other in the amplitude of the wave thereof as mentioned above, they may be shaped to differ from each other in the wavelength thereof.

Although each of the friction sheets provided in accordance with the present invention as described above has two protruding portions, the sheet may have three or more protruding portions. Although the magnetic tape cassette 1 described above is of the Phillips type, the present invention is not limited thereto but may be embodied as a magnetic tape cassette for digital audio tape recording and playback.

In accordance with the present invention, a friction sheet including protruding portions having substantially rectangular cross sections and extending to both ends of the sheet is provided. Hubs and a magnetic tape are supported by the tops of the protruding portions. At least one side edge of each of the tops of the protruding portions is wavily curved so that each of the portions has a curved wall surface extending from the other portion of the friction sheet. Because of the curved wall surface, the rigidity of the protruding portion is increased to make it less likely that the portion is elongated by a force acting thereto in the direction of the thickness of the friction sheet, as occurs in a conventional friction sheet. For that reason, the height of the protruding portion is stably kept at the initial value thereof. Since the protruding portions extend to both ends of the friction sheet; the range of the action of the portions is wide and the size of the sheet is fully utilized. Thus, the play of the hubs is small, and a desired tensile force is always stably applied to the magnetic tape, so that the running of the tape and the appearance of the wound tape are always kept good. Since the rigidity of the friction sheet is virtually increased, the thickness thereof can be made smaller than that of a conventional friction sheet.

What is claimed is:

1. In a magnetic tape cassette including a pair of hubs which are rotatably supported in an internal opening defined between upper and lower half portions of a body of said cassette and on which a magnetic tape is wound, and friction sheets provided between the tops of said hubs and the upper inside surfaces of said cassette and between the bottoms of said hubs and the lower inside surfaces of said cassette, the improvement wherein:

each of said friction sheets comprising protruding portions having substantially rectangular cross-sections and extending substantially in a longitudinal direction of said sheet so that each of said protruding portions reaches both longitudinal side edges of said sheet and at least two hub holes are located between said protruding portions, at least one side edge of each of said protruding portions is wavily curved through a plurality of cycles of curves, said protruding portions terminating at portions of said protruding portions of minimum width such that the width of each of said protruding portions is relatively small at both longitudinal ends of said protruding portions, and said hubs and said tape are supported by tops of said protruding portions.

2. The magnetic tape cassette according to claim 1, wherein: one side edge of each of the protruding portions is straight; the width of each of said portions has a minimum value at least near the hub holes; and the waves of the wavily curved side edge of said portions have a phase difference of substantially a half wavelength from each other at each of said holes.

3. The magnetic tape cassette according to claim 2, wherein: each of said protruding portions is wavily curved; and the waves of both side edges of each of said portions have a phase difference from each other so that the width of each of said portions is not uniform.

4. The magnetic tape cassette according to claim 1, wherein: each of said protruding portions is wavily curved; and the waves of both side edges of each of said portions have a phase difference from each other so that the width of each of said portions is not uniform.

5. The magnetic tape cassette according to claim 1, wherein a height of said protruding portions is in a range of 0.1 to 0.3 mm.

6. The magnetic tape cassette according to claim 1, wherein the width of each of the protruding portions is gradually increased and decreased such that the respective protruding portion has a maximum width between the at least two hub holes so as to support the magnetic tape, and has a minimum width at the at least two hub holes so as to support said hubs.

7. The magnetic tape cassette according to claim 1, wherein said protruding portions have curved wall surfaces extending in the direction of thickness of said friction sheet.

8. The magnetic tape cassette according to claim 1, wherein the curved side edges of said protruding portions are wavily curved so as to be nearly symmetrical about said at least two hub holes in the longitudinal direction of said sheet, the contact areas of said protruding portions for the hubs and said magnetic tape being symmetrical in first and second directions therefrom in the longitudinal direction of said friction sheet.

9. The magnetic tape cassette according to claim 1, wherein said protruding portions have outer straight side edges and inner curved side edges.

10. The magnetic tape cassette according to claim 1, wherein said protruding portions have rectangular cross-sections and wavily curved side edges extending in parallel with each other such that the width of each of the protruding portions is maintained substantially constant, and said protruding portions being shaped symmetrically with respect to each other about said at least two hub holes of said friction sheet in the direction of the width thereof.

11. The magnetic tape cassette according to claim 1, wherein said protruding portions include wavily curved side edges differing from each other in the amplitude of the wave thereof such that the width of each of the protruding portions changes in a regular manner, and such that said protruding portions are shaded symmetrically with respect to each other about said at least two hub holes of said friction sheet in the direction of the width thereof.

12. The magnetic tape cassette according to claim 1, wherein the at least one side edge of each of said protruding portions is wavily curved along an entire length of said each of said friction sheets, whereby a predetermined tensile force is stably applied to the magnetic tape wound on said pair of hubs.

13. The magnetic tape cassette according to claim 1, wherein the at least one side edge of each of said protruding portions is wavily curved so as to have a substantially sinusoidal shape along an entire length of said each of said friction sheets.

14. In a magnetic tape cassette including a pair of hubs which are rotatably supported in an internal opening defined between the upper and lower half portions of the body of said cassette and on which a magnetic tape is wound, and friction sheets provided between the tops of said hubs and the upper inside surfaces of said cassette and between the bottoms of said hubs and the lower inside surfaces of said cassette, the improvement wherein:

each of said friction sheets comprising protruding portions having nearly rectangular cross-sections and extending substantially in the longitudinal direction of said sheet so that each of said protruding portions reaches both longitudinal ends of said sheet and at least two hub holes are located between said protruding portions; each of said protruding portions is wavily curved through a plurality of cycles of curves; and the width of each of said protruding portions is uniform.

15. The magnetic tape cassette according to claim 14, wherein the width of each of the protruding portions is gradually increased and decreased such that the respective protruding portion has a maximum width between the at least two hub holes so as to support the magnetic tape, and has a minimum width at the at least two hub holes so as to support said at least two hubs.

16. The magnetic tape cassette according to claim 14, wherein said protruding portions have curved wall surfaces extending in the direction of thickness of said friction sheet.

17. The magnetic tape cassette according to claim 14, wherein the curved side edges of said protruding portions are warily curved so as to be nearly symmetrical about said at least two hub holes in the longitudinal direction of said friction sheet, the contact areas of said protruding portions for the hubs and said magnetic tape being symmetrical in first and second directions therefrom in the longitudinal direction of said friction sheet.

18. The magnetic tape cassette according to claim 14, wherein said each of said protruding portions is wavily curved along an entire length of each of said friction sheets, whereby a predetermined tensile force is stably applied to said magnetic tape wound on said pair of hubs.

19. The magnetic tape cassette according to claim 14, wherein said each of said protruding portions is wavily curved so as to have a substantially sinusoidal shape along a length of said each of said friction sheets.

* * * * *